Jan. 22, 1957 G. H. EASH 2,778,636

ENDLESS TAPE CARTRIDGE

Filed July 13, 1954

INVENTOR.
George H. Eash

BY [signature]
ATTORNEY

United States Patent Office 2,778,636

Patented Jan. 22, 1957

2,778,636

ENDLESS TAPE CARTRIDGE

George H. Eash, Toledo, Ohio, assignor to George H. Poulsen, Toledo, Ohio; The Toledo Trust Company and Charles I. Poulsen, executors of the estate of said George H. Poulsen, deceased Application July 13, 1954, Serial No. 443,090

2 Claims. (Cl. 271—2.18)

This invention relates to magazines or cartridges which contain a length of magnetically treated tape for use with a recording or play back machine, thereby to record on or reproduce sounds on the tape.

Difficulty is experienced in producing cartridges containing endless lengths of tapes which can be operated over an extended period of time because of the charges of static electricity generated in the relative movement of the tape convolutions of the coil. These become so great as to bind the coil and prevent the free rotation necessary in such operation. Consequently in cartridges of this character, the playing or operating time has been substantially reduced, rendering their use greatly restricted.

It is a desideratum to overcome the above difficulty and an object is, therefore, to produce a simple and efficient magnetic tape cartridge in which the tape web is endless and in which greater lengths of tape are usable and which can operate freely without the binding action set up by static electricity charges.

It is found that in the handling of tape cartridges of the above character, the tape not infrequently unwinds from the reel, either fouling within the cartridge or making difficult the return of the excess or unwound tape to the coil. A further object is to obviate this objection and provide the cartridge with new and improved means for restraining the movement of the reel when the cartridge is not in use but to render such restraining means ineffective when the cartridge is conditioned or ready for use.

An embodiment of the invention is shown in the accompanying drawings, by way of illustration but not of limitation, and in said drawings Figure 1 is a top plan view of a magazine or cartridge having an endless magnetic recording-reproducing tape mounted therein, the cover of the magazine being removed;

Figure 1:
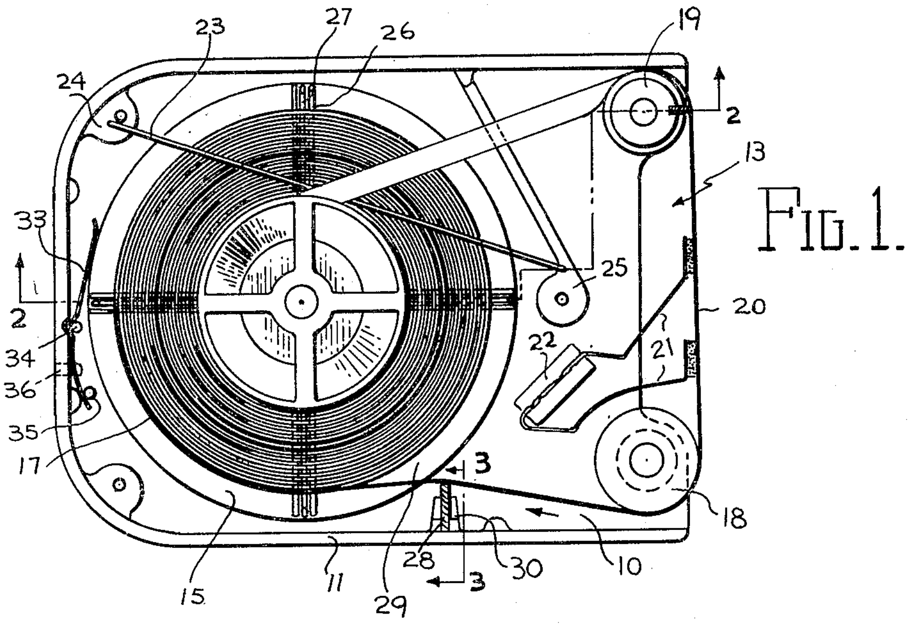
Figure 2:
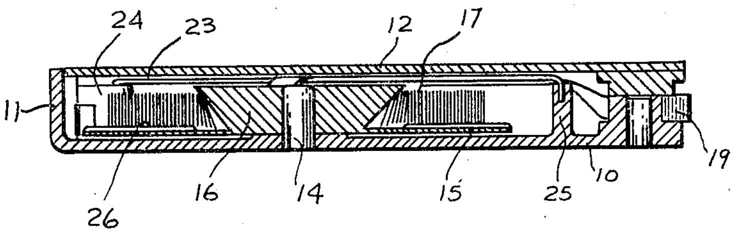
Figure 2 is a longitudinal sectional view substantially on the line 2—2 of Figure 1.
Figure 3:
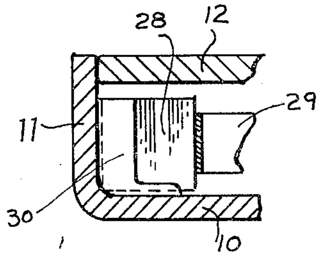
Figure 3 is an enlarged fragmentary sectional view on the line 3—3 of Figure 1.

The illustrated embodiment of the invention comprises a cartridge having a flat bottom wall 10 and an integral upstanding side wall 11. Closing the open side is a cover 12 which may be snapped in place or secured by suitable fasteners. It will be observed that the front end 13 of the cartridge is open to expose a portion of the magnetic tape to contact by the transducer and driving capstan, these latter not being shown. Mounted on the bottom wall 10 substantially midway of the side walls and spaced inwardly from the open end thereof is an upright post 14, on which is rotatably mounted a reel which, as shown, has a circular flange plate 15 and a central upwardly extending hub 16, the latter flaring upwardly and outwardly from the flange plate forming an angle therewith of the order of 50°. Encircling the hub with the lower edge contiguous to the flange plate is a spiral coil 17 of endless magnetic tape. A portion of the tape extends from the coil and is trained about a guide roller 18 mounted at the front portion of the bottom wall 10 with a portion projecting forwardly from the cartridge and also about a stationary guide cylinder 19, also mounted on the bottom wall 10, and disposed adjacent the opposite side of the cartridge. This arrangement provides a front length or run of tape 20 in position to engage the usual transducer head, a pair of felt padded spring arms 21 urging this portion of the tape outwardly to effect the desired contact with the transducer head. In this instance, the spring arms 21 are integral and are mounted on a suitable bracket 22 on the bottom plate of the cartridge. The tape is led from the innermost convolution of the coil 17 over a guide 23 in the form of a length of wire disposed close to and directly above the coil adjacent its inner periphery. The wire 23 is formed with downturned ends engaging sockets in bosses 24 and 25 respectively. In this manner, the tape leaving the coil is spaced from the upper edges thereof to afford free and unrestricted travel thereof. It will be understood that the rotating driving capstan (not shown) snugly cooperates with the roller 18 to grip the tape therebetween and afford the desired tape movement.

The lower edge of the coil 17 rests upon relatively thin elongate pencil-like sticks of graphite 26 carried by the flange plate 15. In this instance, four graphite sticks are employed, arranged equi-distantly and positioned in radially disposed grooves 27 on the upper surface of the flange plate 15.

When a sizable tape coil 17 containing several hundred feet of tape, for example, is employed, the relative movement between the several convolutions creates charges of static electricity sufficient to prevent the free movement of the tape. This is of such magnitude as not infrequently to bind the tape to render practically impossible any tape movement. This difficulty is obviated to a large extent by the use of the rod-like strips 26 of graphite which serve to dissipate accumulated static charges and tending to equalize them throughout the coil. This results in reducing the static charges so that they do not interfere with each other during the tape movement.

To assist in obviating the difficulty caused by the static electricity charges and to somewhat lubricate the tape, a graphite piece 28 is mounted within the casing in such position that the tape wipes over it during its travel. As shown, the graphite piece 28 is disposed between the roller 18 and the reel so that the tape run 29 continuously wipes over the outer end of the graphite piece during its travel. Preferably the stick 28 should be of relatively soft graphite. By so coating the tape as it travels, the static electricity charges from layer to layer tend to be equalized. As shown, the graphite stick 28 is suitably mounted in a bracket 30 in which it may be frictionally held. By positioning the graphite stick 28 in the manner illustrated, it also has the usefulness of preventing tape from engaging the edge of the reel plate 15 and causing a binding action. This is particularly important in the event some tape may be free within the case, and unless provision is made comes into engagement and possible binding relation with the edge of the reel plate. Thus the graphite stick 28 cooperates with the radially disposed graphite sticks 26 in militating against the coil 17 becoming so bound by various charges of static electricity as to prevent free tape movement within the cartridge.

Figure 4:
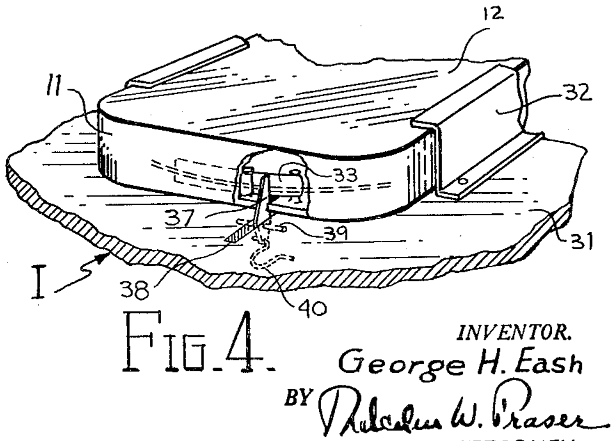
Figure 4 is a fragmentary perspective view showing the cartridge mounted on a recording-reproducing machine, a portion of the cartridge being broken away to illustrate the device for rendering the reel restraining spring ineffective.

As particularly shown on Figure 4, the cartridge is adapted for use in a recording-reproducing instrument I which, as shown, has an exposed panel-like surface 31 on which is a pair of laterally spaced channel guides 32, which guide and hold the cartridge in such position that the transverse tape run 20 is operatively associated with the transducer head and driving capstan. In the rear end of the cartridge is a leaf spring 33 disposed between the side wall 11 and a pain 34 so that one arm of the spring can frictionally engage the edge of the reel plate 15. The opposite end of the spring is disposed between a pin 35 and an inward projection on the side wall. This arrangement is such that normally the spring frictionally engages the reel and holds it against accidental rotation. Manifestly it is important that when the cartridge is applied in position of use, the brake caused by the spring 33 should be released and as shown, between the pins 34 and 35 in the side and bottom walls of the cartridge is a slot 36 into which may project an arm 37, a portion of which extends through a slot 38 in the panel 31 of the instrument I, a pivot 39 being provided for an intermediate portion of the arm. The lower end of the arm is suitably engaged by an off-set spring 40. The arrangement is such that when the cartridge is applied, the arm 37 will be flush with the surface 31 to permit passage thereof, but when the end of the cartridge is reached, the arm 37 will be swung manually upwardly, whereupon the spring 40 will cause the arm 37 to enter the cartridge through the slot 36 and impose sufficient pressure against the spring 33 to rock the opposite end portion thereof away from the reel so that the latter can rotate freely. Manifestly, the spring tension created by the spring 40 is also effective in resiliently urging and holding the cartridge against the driving capstan and the transducer head. As soon as the cartridge is retracted and moved away from the influence of the arm 37, the spring 33 automatically applies friction against the reel to hold it against unwarranted rotating movements. Thus it will be evident that the reel can not rotate freely when it is not in use but when it is applied in position of use, the braking pressure against the reel is automatically released.

Alternatively, a closure cap may be employed for the open front end of the cartridge and carried by such cap is a spring arm which, when the cap is applied, projects inside the cartridge and bears against the rim of the flange plate of the reel. The end of such spring arm may be equipped with a felt pad for bearing resiliently against the reel rim. In this manner, whenever the cap is applied to the cartridge, a brake will automatically be imposed on the reel holding it against turning movements until the cap is removed when it is desired to put the cartridge into use.

It is to be understood that numerous changes in details of construction, arrangement, operation and choice of materials may be effected without departing from the spirit of the invention especially as defined in the appended claims.

What I claim is:

1. In an endless tape cartridge having a casing, a rotatable reel within the casing, an endless coil of magnetic tape wound upon said reel, and guide elements over which a portion of the tape passes to the outside of and from the center of the coil, the improvement which comprises a solid graphite block within the casing for automatically and continuously applying a thin coating of graphite to the tape as it travels thereby to lubricate same and assist in equalizing the charges of static electricity generated between the tape convolutions on the reel, and graphite strips on the reel with which the edges of the tape convolutions engage for militating against the accumulation of charges of static electricity generated in the relative movement of the convolutions.

2. The combination of a magnetic tape recorder or play back instrument, means on the instrument for receiving for operative use a tape containing cartridge having a rotatable reel for the tape, a leaf spring for restraining rotation of the reel, said spring being fixedly mounted at one end, free at the other end and engaged by a pivot intermediate its ends, the free end normally engaging the reel tangentially so that flexure of the portion of the spring between the fixed end and the pivot results in the pivoting of the said free end away from the reel, and means on the instrument engageable with said leaf spring for flexing the same away from the reel when the cartridge is applied in position of use.

References Cited in the file of this patent

UNITED STATES PATENTS

| | | |
|---|---|---|
| 1,825,142 | Bruno | Sept. 29, 1931 |
| 2,206,032 | Foster | July 2, 1940 |
| 2,426,838 | Miller | Sept. 2, 1947 |